(12) United States Patent
Shenk

(10) Patent No.: US 12,336,453 B2
(45) Date of Patent: Jun. 24, 2025

(54) KNIFE INSERT AND RETRACT WITH INDEPENDENT KNIFE PROTECTION OF AGRICULTURAL BALER

(71) Applicant: CNH Industrial America LLC, New Holland, PA (US)

(72) Inventor: Jonathan Shenk, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 809 days.

(21) Appl. No.: 17/564,796

(22) Filed: Dec. 29, 2021

(65) Prior Publication Data
US 2023/0200303 A1    Jun. 29, 2023

(51) Int. Cl.
| | |
|---|---|
| A01D 75/18 | (2006.01) |
| A01F 15/10 | (2006.01) |
| A01F 29/09 | (2010.01) |
| A01F 29/10 | (2006.01) |
| A01F 29/16 | (2006.01) |

(52) U.S. Cl.
CPC ............ *A01D 75/182* (2013.01); *A01F 15/10* (2013.01); *A01F 29/095* (2013.01); *A01F 29/10* (2013.01); *A01F 29/16* (2013.01); *A01F 2015/107* (2013.01)

(58) Field of Classification Search
CPC ...... A01F 75/182; A01F 15/10; A01F 29/095; A01F 29/10; A01F 29/16; A01F 2015/107; A01F 15/106; A01F 2015/108
See application file for complete search history.

(56) References Cited

U.S. PATENT DOCUMENTS

| | | | |
|---|---|---|---|
| 5,974,776 A | 11/1999 | Prellwitz | |
| 6,128,995 A | 10/2000 | Geng | |
| 6,912,835 B1 | 7/2005 | Chabassier | |
| 7,404,284 B2 | 7/2008 | Viaud et al. | |
| 7,770,371 B2 | 8/2010 | Lucot et al. | |
| 9,913,433 B2 * | 3/2018 | Singh | A01D 90/04 |
| 11,197,425 B2 * | 12/2021 | Tewes-Kampelmann | A01D 90/04 |

(Continued)

FOREIGN PATENT DOCUMENTS

| | | | | |
|---|---|---|---|---|
| DE | 86 31 062 U1 | 3/1988 | | |
| DE | 19706429 C1 * | 4/1998 | ............ | A01D 90/04 |

(Continued)

OTHER PUBLICATIONS

Extended European Search Report for EP Application No. 22213078.3 dated May 25, 2023 (seven pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

An agricultural baler includes: a frame; a feeder system coupled with the frame and including: a cutting assembly coupled with the frame and including: at least one knife configured for cutting a crop material; an overload protection mechanism associated with a single one of the at least one knife and including a pivot device including an engagement device including an offset configuration; and a displacement apparatus configured for selectively forcing the at least one knife to occupy a first position and for selectively forcing the at least one knife to occupy a second position, each by way of the engagement device.

17 Claims, 7 Drawing Sheets

(56) References Cited

U.S. PATENT DOCUMENTS

| | | | |
|---|---|---|---|
| 11,632,911 B2 * | 4/2023 | De Baere | A01D 75/182 |
| | | | 241/32 |
| 11,917,949 B2 * | 3/2024 | De Baere | A01F 15/10 |
| 2009/0272089 A1 * | 11/2009 | Lucot | A01D 90/04 |
| | | | 56/131 |
| 2013/0167498 A1 | 7/2013 | Haycocks | |
| 2014/0096692 A1 | 4/2014 | Baldauf | |
| 2016/0029567 A1 | 2/2016 | Meiners | |
| 2020/0093068 A1 * | 3/2020 | Claeys | A01F 15/10 |
| 2021/0251149 A1 | 8/2021 | De Baere | |
| 2021/0267129 A1 * | 9/2021 | McClure | A01F 29/09 |

FOREIGN PATENT DOCUMENTS

| | | | | |
|---|---|---|---|---|
| DE | 202014006083 U1 * | 12/2015 | | A01D 90/04 |
| DE | 102019005926 A1 * | 9/2020 | | A01D 90/04 |
| EP | 0 077 474 A1 | 6/1986 | | |
| EP | 0564922 A1 * | 10/1993 | | A01D 90/04 |
| EP | 1609354 A2 | 12/2005 | | |
| EP | 2910106 A1 * | 8/2015 | | A01D 90/04 |
| GB | 2625401 A * | 6/2024 | | A01D 90/04 |
| GB | 2625402 A * | 6/2024 | | A01D 90/04 |
| WO | 2020240428 A1 | 12/2020 | | |

\* cited by examiner

KNIFE INSERT AND RETRACT WITH INDEPENDENT KNIFE PROTECTION OF AGRICULTURAL BALER

FIELD OF THE INVENTION

The present invention pertains to an agricultural baler, and, more specifically, to a crop cutting assembly of the agricultural baler.

BACKGROUND OF THE INVENTION

Agricultural harvesting machines, such as agricultural balers (which can be referred to as balers), have been used to consolidate and package crop material (which, depending upon the application, can also be referred to as forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler, travels along the swath or windrows (hereinafter, collectively referred to as windrows, unless otherwise specified) to pick up the crop material. In the case of round balers, the crop material is formed into cylindrically-shaped round bales.

More specifically, pickups of the baler gather the cut and windrowed crop material from the ground, and then convey the cut crop material toward a bale-forming chamber within the baler (that is, the bale chamber). A drive mechanism operates to activate any pickups, augers, and/or a rotor of a feed mechanism (which can also be referred to as a feeder system). A pickup can convey crop material in an overshot manner, while a rotor can convey crop material toward or into the bale chamber in an undershot manner. A conventional bale chamber may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. After wrapping, a cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

The feeder system can include not only the rotor but also a floor and a cutting assembly. The rotor, which is downstream of the pickup, can be positioned above the floor which the crop material traverses prior to entering the bale chamber and can work in conjunction with, and cooperatively with, the cutting assembly. The rotor can include a rotor shaft (extending transversely) and a plurality of tines (which can have a generally triangular or star-shaped configuration) spaced apart across the transverse extent of the baler. The tines are configured to engage and thereby to push the crop material towards the bale chamber and can be grouped in pairs, with a relatively short distance between the tines of a given pair. The floor can include a plurality of slots across the transverse extent of the floor, each slot extending longitudinally in the floor (that is, parallel or otherwise aligned with a direction of crop flow). The cutting assembly can include a plurality of knives (which can also be referred to as cutters) which are selectively received in the slots of this floor, respectively. When inserted through the slots so that the knives extend at least partially above the floor, each respective knife (depending upon the design) can extend between a pair of tines of the rotor, as the rotor shaft rotates the tines. Further, the knives, as they extend through the slots above the floor are configured to cut the crop material to a predetermined length, as the crop material passes by the knives prior to the crop material entering the bale chamber. By cutting the crop material into smaller lengths prior to entering the bale chamber, a denser bale can be formed in the bale chamber, which advantageously provides more crop material per bale, enables less wrap material to be used to wrap the bale, and enables better stacking of bales during storage and/or transit.

When a foreign object, such as a rock, is taken up by the pickup and conveyed towards the bale chamber, the foreign object can encounter one or more knives. To prevent or otherwise mitigate damage to the knives, the knives can have overload protection by way of an overload protection mechanism, which can include a spring which urges one or more knives to extend at least partially above the floor and allows the one or more knives to drop down at least partially below the floor when the foreign object strikes the one or more knives. Individual knife overload protection is known to use a spring for each knife. Having such overload protection for each knife (which can be referred to as individual knife overload protection) is advantageous. Overload protection is also known, not using springs, that is not assigned to individual knives but to an entire bank of knives of the feeder system.

During use, knives can become jammed or otherwise stuck with respect to the slots in the floor, which can inhibit servicing and/or replacing of respective knives. That is, dirt and debris can collect around or enter into the slots, thereby causing at least two problems. First, knives already deployed at least partially above the floor can become stuck in their respective slots because of the dirt and debris and thus unable to retract back down through the slots upon encountering a foreign object or otherwise needing to be retracted or serviced. Second, knives not yet deployed at least partially above the floor can become unable to progress through the respective slots because of the dirt and debris that has collected at the slots and/or on the knives, blocking the knives from deploying through the slots into position for cutting; for, the spring force urging the knives into a deployed position (and thus providing the overload protection) is not strong enough to burst through this blockage. To clear a blockage, for example, that is preventing an individual knife from inserting up through the slot, it is known to use a hydraulic linear actuator to push on the spring of the individual knife overload protection mechanism; but, this design is often not strong enough to push through the blockage.

In the current state of the art, feeder systems include either an individual knife overload protection mechanism with a hydraulic linear actuator to push through a spring of the individual knife overload protection mechanism to clear a blockage, or the ability to force all knives to be inserted or retracted. Neither option is fully satisfactory, and the former can be improved upon.

What is needed in the art is a simple and effective way to have, simultaneously, both individual knife overload protection and an effective way to forcibly insert and to forcibly retract the knives of a feeder system.

SUMMARY OF THE INVENTION

The present invention provides an agricultural baler with a feeder system including an individual knife overload protection mechanism including a pivot device connected with a displacement apparatus configured for forcibly inserting and retracting the knives of a feeder system without needing a spring of the knife overload protection mechanism.

The invention in one form is directed to a feeder system of an agricultural baler, the feeder system being coupled with a frame of the agricultural baler, the feeder system including: a cutting assembly coupled with the frame and including: at least one knife configured for cutting a crop material; an overload protection mechanism associated with a single one of the at least one knife and including a pivot device including an engagement device including an offset configuration; and a displacement apparatus configured for selectively forcing the at least one knife to occupy a first position and for selectively forcing the at least one knife to occupy a second position, each by way of the engagement device.

The invention in another form is directed to an agricultural baler, including: a frame; a feeder system coupled with the frame and including: a cutting assembly coupled with the frame and including: at least one knife configured for cutting a crop material; an overload protection mechanism associated with a single one of the at least one knife and including a pivot device including an engagement device including an offset configuration; and a displacement apparatus configured for selectively forcing the at least one knife to occupy a first position and for selectively forcing the at least one knife to occupy a second position, each by way of the engagement device.

The invention in yet another form is directed to a method of using an agricultural baler, the method including the steps of: providing a frame and a feeder system coupled with the frame, the feeder system including a cutting assembly coupled with the frame, the cutting assembly including at least one knife configured for cutting a crop material and an overload protection mechanism associated with a single one of the at least one knife, the overload protection mechanism including a pivot device including an engagement device including an offset configuration; and forcing selectively, by a displacement apparatus of the cutting assembly, the at least one knife to occupy a first position, by way of the engagement device; and forcing selectively, by the displacement apparatus, the at least one knife to occupy a second position, by way of the engagement device.

An advantage of the present invention is that it provides individual knife overload protection.

Another advantage is that it provides a way to forcibly insert and retract the knives. This may be done to clear blockage of the knives due to dirt and debris, to raise or lower the knives for servicing, or to run the baler with the knives down so as not to cut the crop material.

Yet another advantage is that it provides a way to have individual knife overload protection employing a spring while being able to selectively engage and thereby force the knives up or down. Thus, a mechanism is provided that forces knives to insert and to retract when needed (that is, the knives are positively inserted and positively retracted) and that allows a respective knife to fall away in an overload event.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
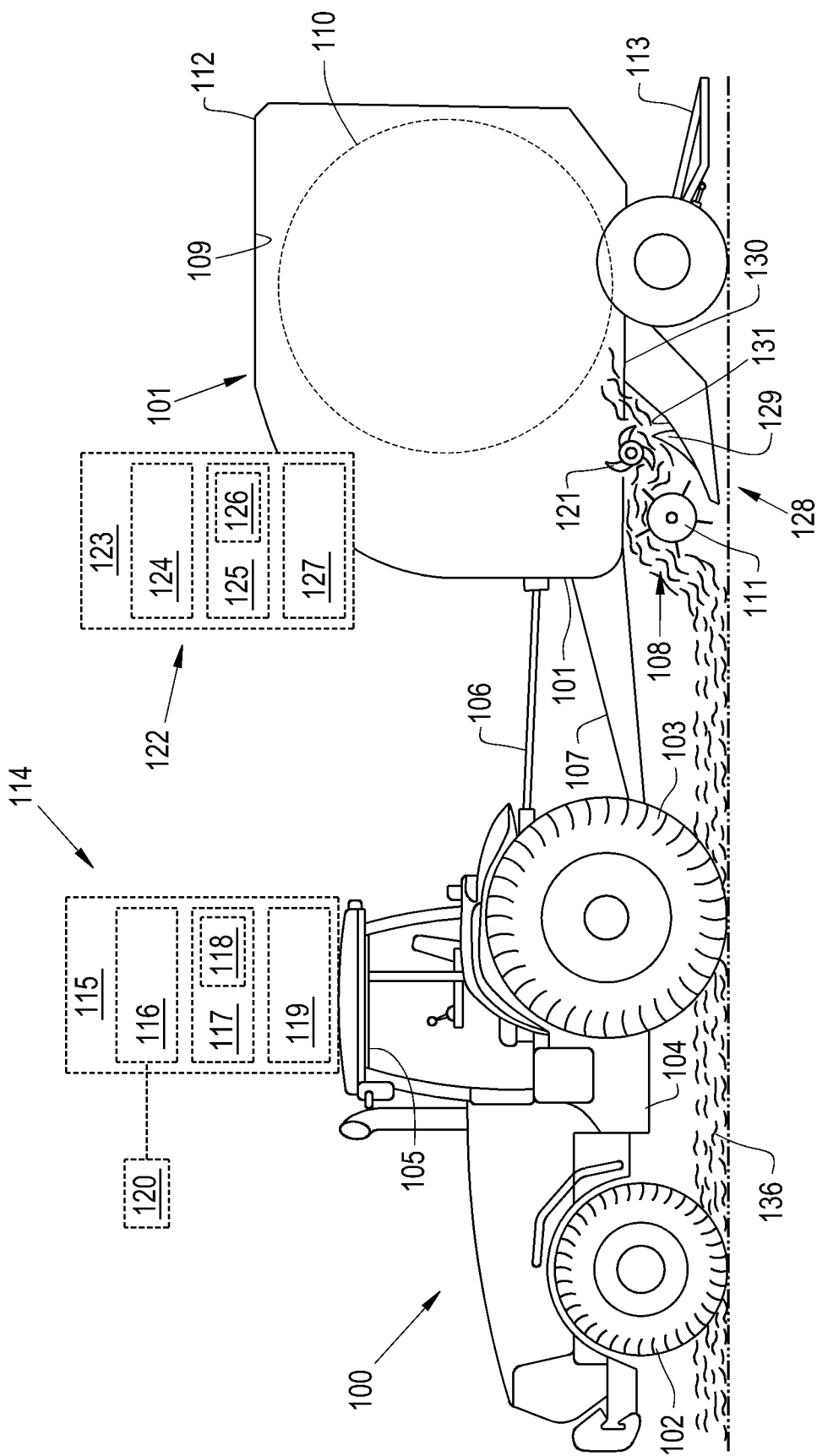
FIG. 1 illustrates a schematic side view of an exemplary embodiment of an agricultural vehicle, formed as a tractor, and an agricultural baler, the agricultural baler including a feeder system, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101, in accordance with the present invention, to perform a baling operation within a field. As shown, work vehicle 100 can be configured as an agricultural tractor, such as an operator-driven tractor or an autonomous tractor. However, in some embodiments, the work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system (which can be referred to generally as a crop collector) mounted on a front end of baler 101. Feeder system 108 may, for example, include a pickup 111, a rotor 121, and a cutting assembly 128. Pickup 111 includes a rotating wheel with tines that collect crop material 136 from the ground and direct the crop material 136 toward a bale chamber 109 of baler 101 in an overshot manner (rotating clockwise in FIG. 1). Rotor 121 includes a rotating shaft (rotor shaft) and a plurality of generally triangular or star-shaped tines (rotor tines) mounted to the shaft (as described above) that push or otherwise move crop material 136 towards or into bale chamber 109, in an undershot manner (rotating counter-clockwise in FIG. 1). Feeder system 108 can also include a rotating shaft (not shown) generally between pickup and rotor 121 that includes side augers for moving crop material 136 inwardly prior to entering bale chamber 109. Cutting assembly 128 is disposed generally below rotor 121 and includes a floor 131 and a plurality of knives 129.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 to which all of the components of baler 101 are directly or indirectly coupled. Thus, feeder system 108, and thus also cutting assembly 128, are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123, as indicated in FIG. 1, can be in communication with controller 115 of work vehicle 100, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center, which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
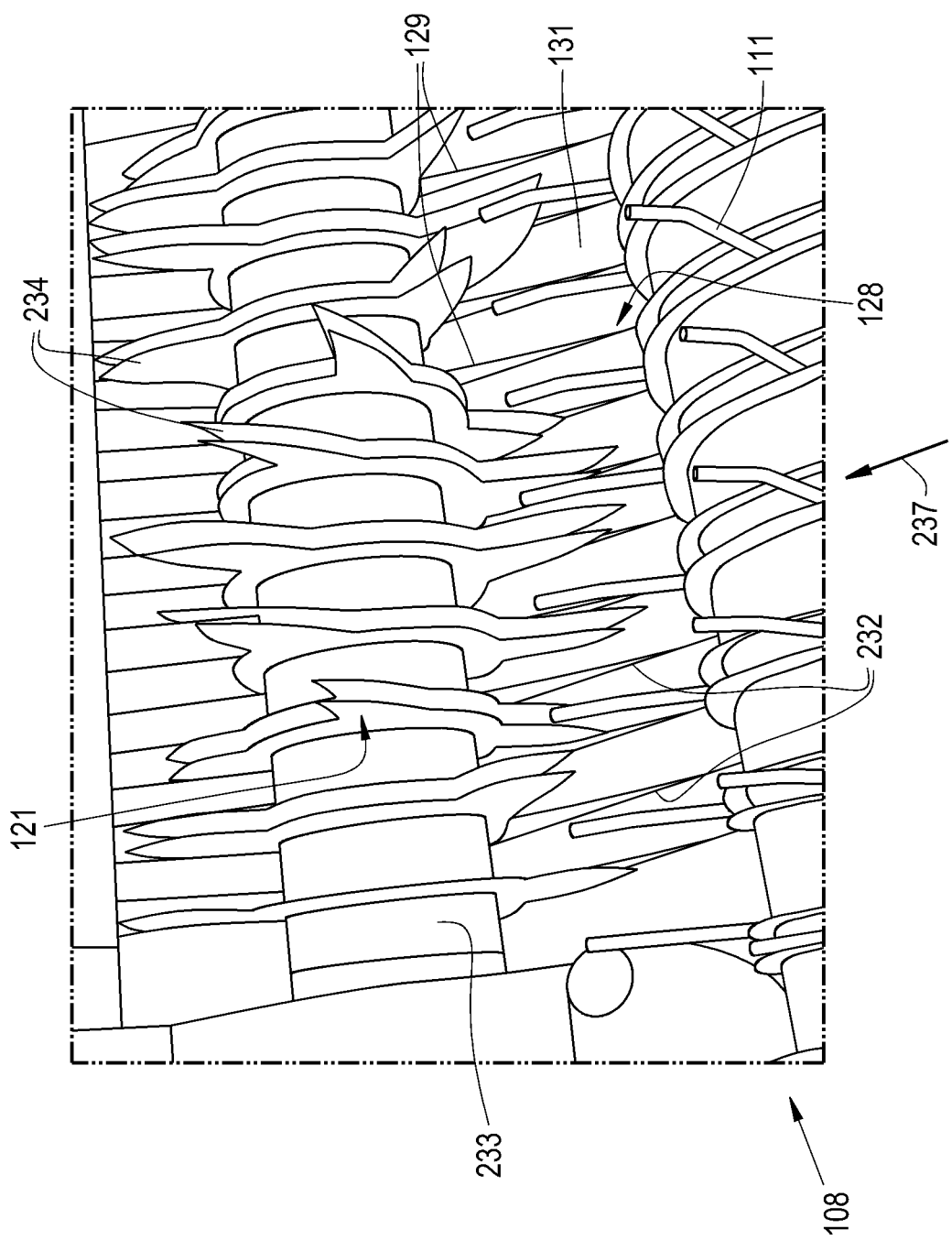
FIG. 2 illustrates a perspective view of the feeder system of the agricultural baler of FIG. 1, the feeder system including a cutting assembly including a knife, with portions broken away, in accordance with an exemplary embodiment of the present invention.

Referring now to FIG. 2, there is shown a perspective view of feeder system 108, with portions broken away. Shown are pickup 111 (with tines), rotor 121, and cutting assembly 128. Rotor 121 is shown to include rotor shaft 233 and rotor tines 234 mounted to rotor shaft 233. Rotor tines 234 are spaced apart transversely from one another and, as shown in FIG. 2, can be grouped in pairs. As rotor shaft 233 rotates, a given pair of rotor tines receive therebetween a respective upstanding knife 129. Cutting assembly 128 is shown to include floor 131 and a plurality of knives 129 extending transversely across the front of baler 101. Floor 131 includes a plurality of longitudinally extending slots 232 (running generally in the flow direction of crop material 136) through which a respective knife 129 can extend when deployed. FIG. 2 shows several such knives 129 already having been inserted through respective slots and thus deployed and ready to encounter crop material 136. Knives 129 are configured for cutting crop material 136 as crop material 136 is urged in the direction of flow 237 of crop material 136. Knives 129 cut crop material 136 to a predetermined length, such as two-and-one-half inches, for example and not by way of limitation.

Figure 3:
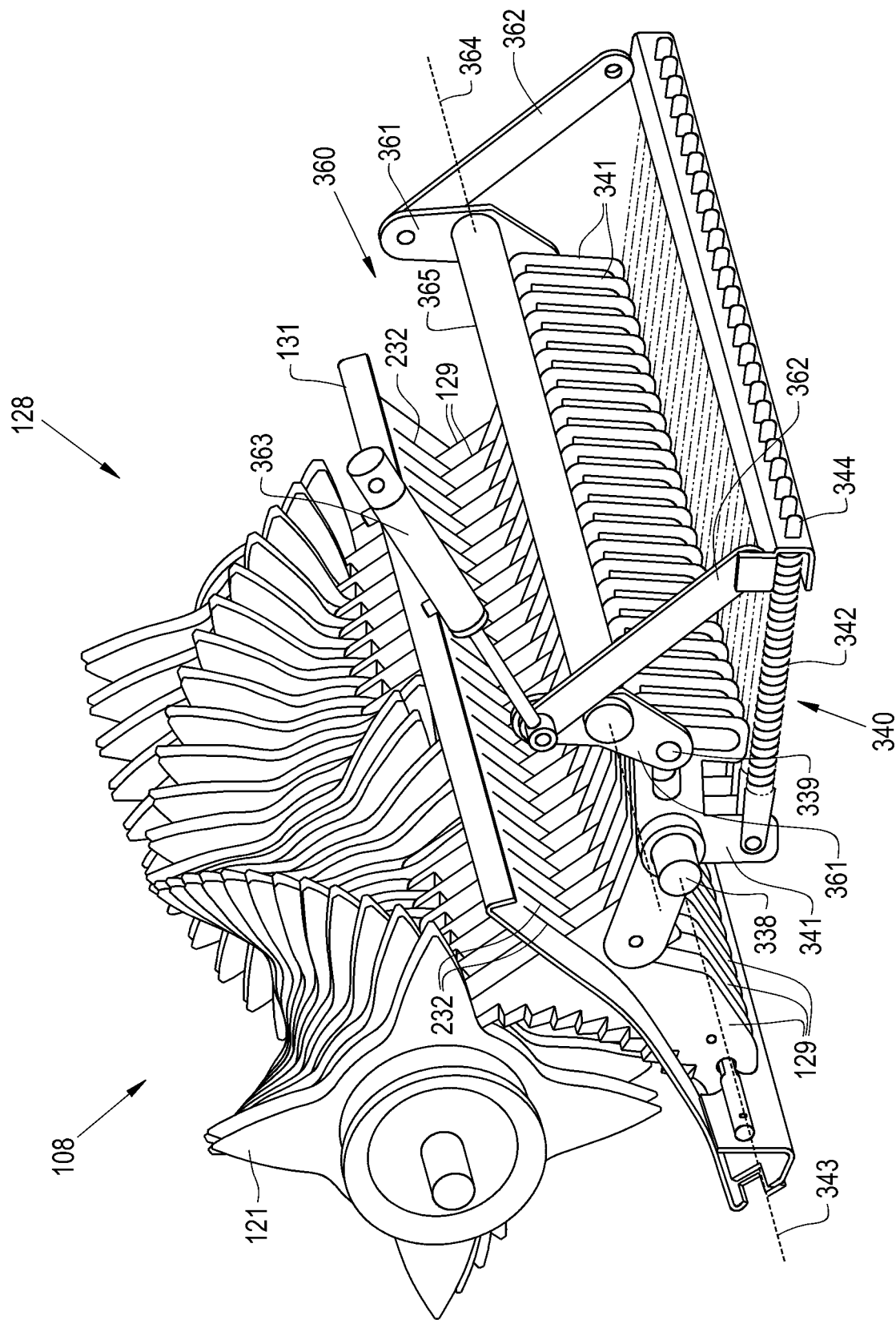
FIG. 3 illustrates a schematic perspective view of the cutting assembly of FIG. 2, with portions broken away, the cutting assembly including an overload protection mechanism and a displacement apparatus, in accordance with an exemplary embodiment of the present invention.

Referring now to FIG. 3, there is shown a perspective view of a portion of feeder system 108, which includes cutting assembly 128. Cutting assembly 128 (all structures of which are coupled with frame 130) includes floor 131, knives 129 (not shown in FIG. 3), an overload protection mechanism 340 coupled with frame 130, pivot bar 338, a displacement apparatus 360 coupled with frame 130, and engagement bar 339. Overload protection mechanism 340 is associated with a single one of the at least one knife 129. Stated another way, a single one of overload protection mechanism 340 is assigned to and coupled with a single knife 129, such that each knife has its own individual overload protection mechanism 340. Overload protection mechanism 340 (discussed in more detail below) includes a pivot device 341 (which can also be referred to as a rocker) coupled with the knife 129 to which a respective overload protection mechanism 340 is assigned. Overload protection mechanism 340 further includes a spring 342 which urges and thus biases pivot device 341 to cause knife 129 to be in an up position (which can also be referred to as an insertion position 475 of knife 129), that is, inserted through the respective slot 232 so as to be able to cut crop material 136. Overload protection mechanism 340 protects each knife from an overload situation, such as when a rock is taken up by the pickup 111 and fed in direction of travel 237 to floor 131, with the result that this rock can strike one or more knives 129, which can destroy or otherwise damage and thus hinder the functionality of the knives 129 that are struck. When a rock, for instance, strikes a respective knife 129, knife 129 gives way and can fall at least partially below floor 131 momentarily, by way of overload protection mechanism 340. By having mechanism 340 assigned to only one knife 129, only those knives that are struck by a foreign object will give way and thus retract under the force of the foreign object, rather than all of the knives 129, thereby allowing cutting to continue by those knives 129 that were not struck by the foreign object. Pivot device 341 can be made of any suitable material, such as steel. Pivot device 341 is pivotably connected to pivot bar 338, which can be formed as a tube and of any suitable material, such as steel. Pivot bar 338 (which is coupled with frame 130) extends transversely across the transverse extent of floor 131 so as to pivotably connect with each pivot device 341 assigned to each knife 129; that is, while pivot bar 338 remains relatively stationary (not pivoting), each pivot device 341 can pivot about pivot bar 338. Thus, each pivot device 341 can pivot about an axis of rotation 343 in either direction about pivot bar 338 and can include structure allowing such pivoting relative to pivot bar 338, such as bearings.

Displacement apparatus 360 is configured for selectively forcing at least one knife 129 to occupy a first position 475 and for selectively forcing at least one knife 129 to occupy a second position 576, each by way of an engagement device 453 of pivot device 341 and without using or needing spring 342 (discussed below). Displacement apparatus 360 (discussed in more detail below) includes an actuation arm 361, a stabilizing arm 362, and an actuator 363. Actuation arm 361 couples with pivot device 341 by way of engagement device 453 and is configured for rotating about an axis of rotation 364 in either direction. Actuation arm 361 can pivot about axis of rotation 364 by way of a pivot connection formed with any suitable structure that can support actuation arm 361 so as to be able to pivot at axis of rotation 364. Such structure (which can be considered to be a part of displacement apparatus 360) can include, for example, a transversely extending shaft 365 extending between two actuation arms 361. Actuation arms 361 can rotate about shaft 365 in either direction, shaft 365 being mounted to nearby structure and thus relatively fixed and coupled with frame 130. Thus, a respective actuation arm 361 is can be in rotatable bearing engagement at one end of shaft 365. Displacement apparatus 360 may include two of actuation arm 361 and stabilizing arm 362, as shown. Displacement apparatus can include only one of actuator 363 (though two or more can be provided) at a lateral end of the entire group of knives 129 of cutting assembly 128.

Further, engagement bar 339 can couple actuation arm 361 with each pivot device 341 and can be formed as a tube and of any suitable material, such as steel. More specifically, engagement bar 339 can extend transversely across the transverse extent of floor 131 so as to connect with each pivot device 341 assigned to each knife 129. Engagement bar 339 can be connected, such as fixedly connected, to each actuation arm 361, such as by welding or pinning, or the like; alternatively, engagement bar 339 can be rotatably connected to actuation arm 361. Further, engagement bar 339 can couple with engagement device 453 formed as a slot 453, with engagement bar 339 extending into slot 453 so as to be slidable therein.

Figure 4:
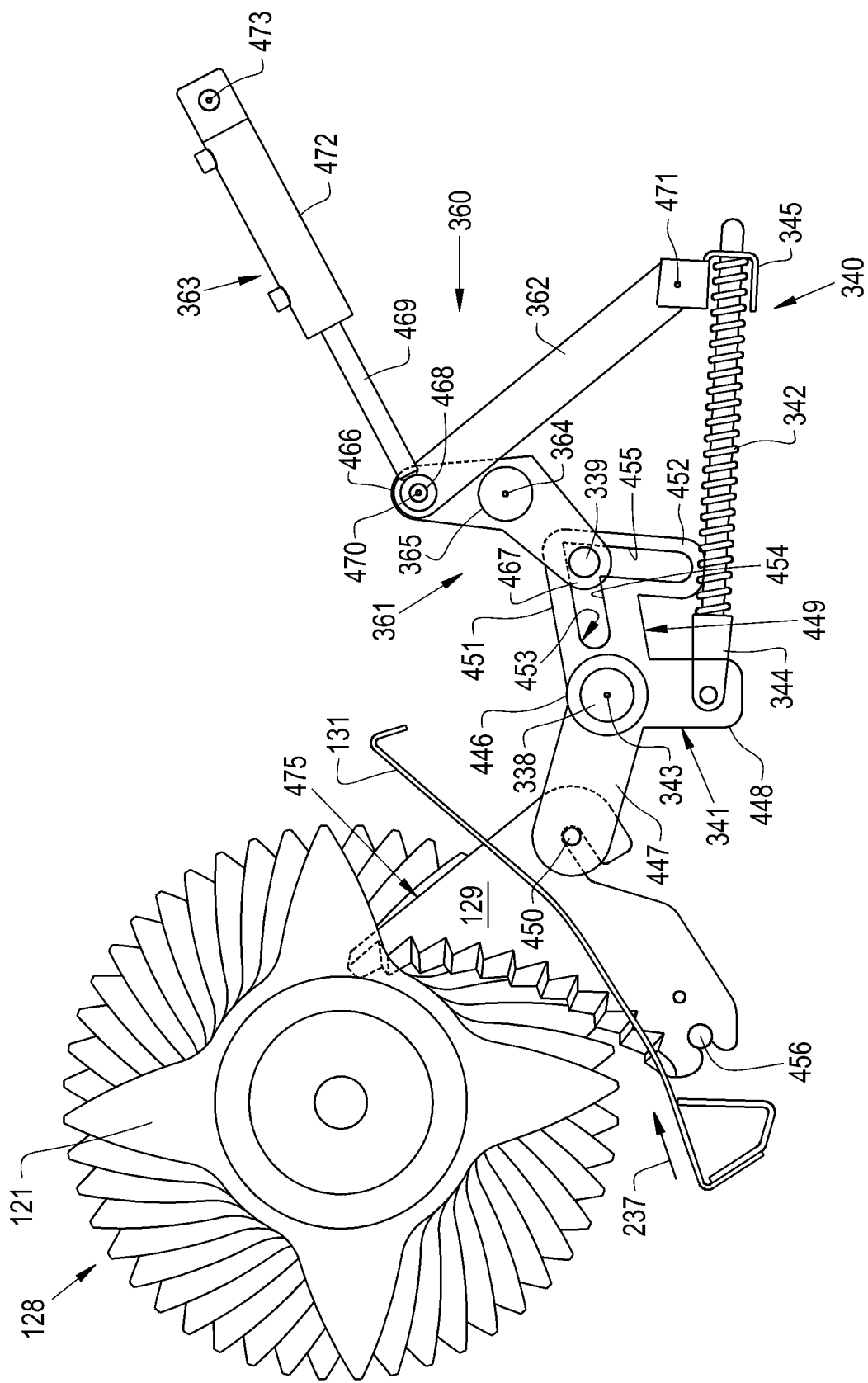
FIG. 4 illustrates a schematic side view of the cutting assembly with the overload protection mechanism and the displacement apparatus of FIG. 3, with portions broken away, the knife being in an up position, with the overload protection mechanism being free to move relative to the displacement apparatus, in accordance with an exemplary embodiment of the present invention.

Referring now to FIG. 4, there is shown schematically a side view of cutting assembly 128, with portions broken away, with knife 129 up in its first (up/insertion) position 475, and overload protection mechanism 340 and displacement apparatus 360 in their respective home positions. Cutting assembly 128, in FIG. 4, is shown to include floor 131, knives 129, pivot 456, overload protection mechanism 340, pivot bar 338, displacement apparatus 360, and engagement bar 339. Pivot 456 forms a pivot about which knife 129 can move and which knife 129 receives by way of a left-most mouth or cutout. Pivot 456 can be a bar, rod, or tube that extends substantially the transverse extent of floor 131 and can have any cross-section and/or positioning that allows for knives 129 to be removed during servicing; for example, when in their insertion position 475), knives 129 can be lifted out, or otherwise pivoted and lifted out, of the respective slot 232 and removed altogether from baler 101. Regarding overload protection mechanism 340, overload protection mechanism 340 is shown to include pivot device 341, rod 344, and spring 342. Before addressing pivot device 341, a fixing mechanism 345 is also shown in FIG. 4, and can be formed as a bracket (bracket 345 is coupled with frame 130). Though bracket 345 provides functionality for overload protection mechanism 340 and is coupled with frame 130, bracket 345 is not included in overload protection mechanism 340, as it can serve a series of overload protection mechanisms 340 assigned individually to a series of individual knives 129, as shown in FIG. 3.

Pivot device 341 pivots about axis of rotation 343 and can generally be formed as a plate. Pivot device 341 can include a base 446, a first arm 447, a second arm 448, and a third arm 449. Each of first arm 447, second arm 448, and third arm 449 are coupled with base 446 and thereby with one another. The first arm 447 can be fixedly connected at its distal end to an engagement shaft 450 (which can be a pin), such as by welding or pinning, or the like. Engagement shaft 450 can slide in both directions within the notch formed in a downstream end of knife 129, as shown in FIG. 4. Second arm 448, which can be disposed at any suitable angular relationship relative to first arm 447 (such as an obtuse angle), can be pivotably connected with rod 344 in any suitable manner. Third arm 449 can be referred to as an extension, or an extension arm, of pivot device 341; extension arm 449, as described, is unconventional. Third arm 449 (as this structure will be primarily referenced herein) can include a first segment 451 and a second segment 452, first and second segments 451, 452 being offset relative to one another so as to form an angular relationship relative to one another, such as an obtuse angle (but not a straight line). First segment 451 can be at any angular relationship relative to first arm 447 and second arm 448; FIG. 4 shows, for example, that first segment 451 is at an obtuse angle relative to first arm 447 and an obtuse angle (nearly a right angle) relative to second arm 448. Further, third arm 449 includes an engagement device 453. Engagement device 453 can include a slot 453, such that engagement device 453 is formed as a slot 453. Slot includes a first leg 454 and a second leg 455 offset from first leg 454. First leg 454 is formed in first segment 451, and second leg 455 is formed in second segment 452. In this way engagement device 453 includes an offset configuration. More specifically, first and second legs 454, 455 can be approximately 90 degrees relative to one another, though each of first and second legs 454, 455 can include a slight curvature so as to accommodate an arcuate path of engagement bar 339 in either of legs 454, 455. Thus, first and second segments 451, 452 of third arm 449, as well as first and second legs 454, 455 of slot 453, can form generally an L-shaped configuration, respectively.

Rod 344 extends through a hole in bracket 345 and is coupled with pivot device 341 (for example, such that rod 344 and pivot device 341 can pivot relative to one another), such as by a shaft, bolt, or pin. Spring 342 can surround and mount to rod 344 (as shown) and be braced at both ends to limit the extent of spring 342, being limited at its left end (as viewed in FIG. 4) by a portion of rod 344 and being limited at its right end by bracket 345. An actuator is not attached to overload protection mechanism 340 so as to push knife up or down, for example, so as to clear knife 129 of jams caused by dirt and debris relative to floor 131. In normal operation, the compressive force of spring 342, together with the positioning of engagement shaft 450 in the notch of the downstream end of knife 129, urges knife 129 in the up/first/insertion position 475, as shown in FIG. 4. As indicated, when a knife 129 encounters a foreign object, knife 129 can retract momentarily at least partially below the surface of floor 131. Once the foreign object passes, the force of spring 342 urges knife 129 to return to its insertion position 475.

Figure 6:
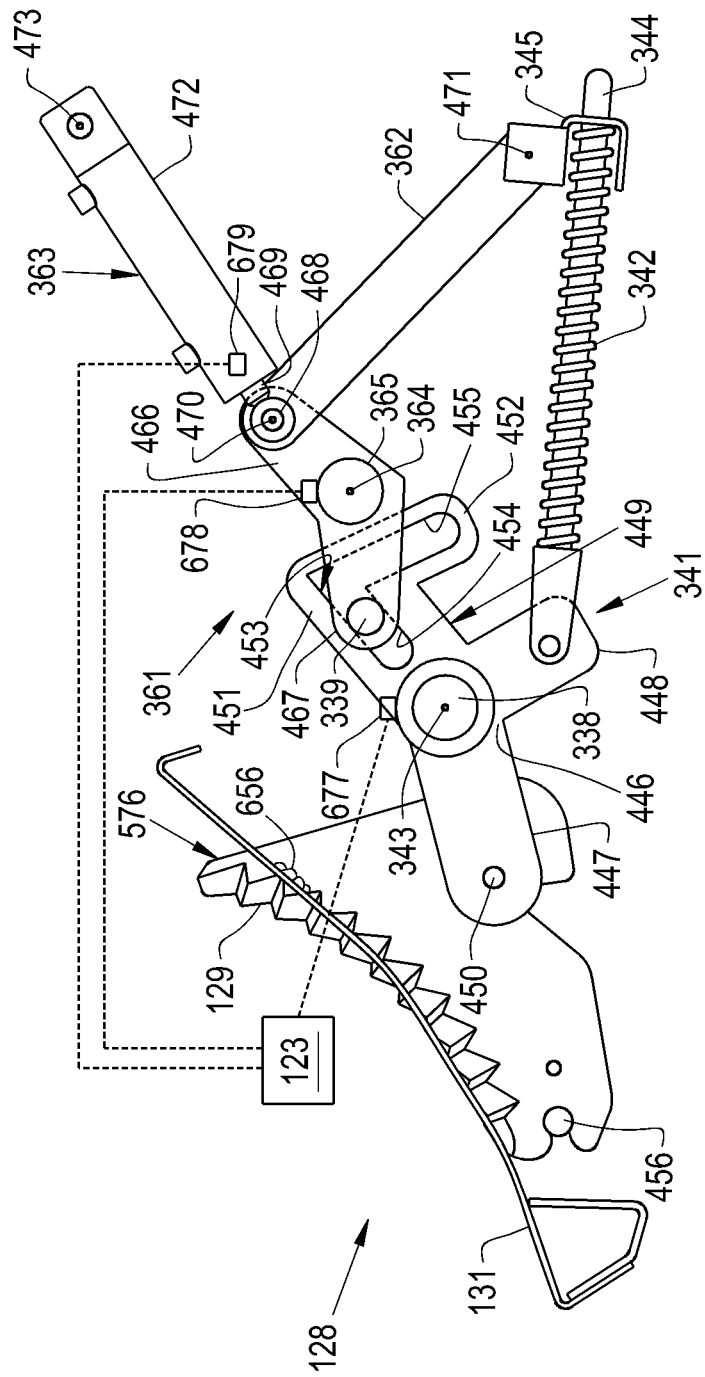
FIG. 6 illustrates a schematic side view of the cutting assembly with the overload protection mechanism and the displacement apparatus of FIG. 3, with portions broken away, the knife having been forcibly moved to the down position by way of the displacement apparatus, in accordance with an exemplary embodiment of the present invention.

Displacement apparatus 360 is configured for selectively forcing all of the knives 129 as a group (that is, the entire knife bank, as shown in FIG. 3) to occupy first position 475 and for selectively forcing all of the knives 129 to occupy a second position 576, each by way of engagement device 453. First position 475 is an insertion position 475 such that knives 129 are up and ready to cut crop material 136, and second position 576 is a retraction position 576 such that knives 129 are at least partially down below floor 131. When displacement apparatus 360 forces knives 129 down (FIG. 6), knives 129 are held down in retraction position 576 by actuator 363 until actuator 363 releases knives 129 from retraction position 576 and in this way can be locked in retraction position 576 (FIG. 6). Displacement apparatus 360 includes actuation arm 361, stabilizing arm 362, and actuator 363. Actuation arm 361, as shown in FIG. 4, can have a central section with shaft 365 therein, with shaft 365 being coupled with frame 131. Further, actuation arm 361 is pivotable about shaft 365 and about axis of rotation 364 and includes a first end 466 and a second end 467. Actuation arm 361 is coupled with actuator 363 at first end 466, such as by way of a pivotable connection by way of a pin or shaft 468. Thus, shaft 468 can be pivotably coupled with first end 466 of actuation arm 361, stabilizing arm 362, and/or a rod 469 of actuator 363, with respect to an axis of rotation 470. Further, actuation arm 361 is coupled with engagement device 453 at second end 467 by way of engagement bar 339, which can be fixedly connected to actuation arm 361. Stabilizing arm 362 can include two opposing ends. At one of the opposing ends, stabilizing arm 362 can be pivotably coupled with actuation arm 361 and actuator 363 by way of shaft 468. At the opposing end, stabilizing arm 362 can be pivotably coupled, about axis of rotation 471, with bracket 345 by way of an intervening upstanding bracket on bracket 345, as shown in FIG. 4.

Actuator 363, as shown in FIG. 4, can be formed as a linear actuator 363. As a linear actuator, cylinder assembly 363 can be, for example, a hydraulic cylinder assembly, a pneumatic cylinder assembly, or an electrically actuated cylinder assembly (which can include gearing and/or screws). In FIG. 4, linear actuator 363 is a hydraulic cylinder assembly, including a cylinder 472 (housing a piston) and a rod 469 that is moved linearly by the action of the piston. As a hydraulic cylinder assembly 363, cylinder assembly 363 can be controlled by suitable valving and can include fluid lines which fluidly communicate an interior of cylinder 472 with a pump and a reservoir of hydraulic cylinder fluid, such as hydraulic oil; this pump and reservoir can be maintained on work vehicle 100 and/or on baler 101. A proximal end of cylinder 472 (right-most end in FIG. 4) is pivotably coupled with frame 130 and pivots about a pivot axis 473. Cylinder 472 pivots about pivot axis 473 as rod 469 extends and retracts.

As indicated, FIG. 4 shows knife in insertion position 475 and each of overload protection mechanism 340 and displacement apparatus 360 in their respective home positions. In the home position of overload protection mechanism 340, pivot device 341 is in its up (insertion) position 475 as well, as spring 342 is not yet compressed (thought it does urge pivot device 341 in its up position. In the home position of displacement apparatus 360, actuation arm 361 is angularly positioned such that engagement bar 339 is in an elbow of slot 453, the elbow being where first and second segments 451, 452 and first and second legs 454, 455 join one another, respectively (though this joining can be seamless); this elbow, however, can be fixed and thus not an articulating joint. In these home positions, pivot device 341 is free to rotate about axis 343 without interference from displacement apparatus 360. In this way, pivot device 341 is able to pivot counter-clockwise (downwardly) when knife 129 is struck by a foreign object, and, conversely, to pivot back clockwise (upwardly) when the foreign object has passed, all without interference from displacement apparatus 360, as described with respect to FIG. 5. On the other hand, displacement apparatus 360, from its home position, can positively cause pivot device 341 to pivot counter-clockwise (downwardly), causing knife 129 to move from its insertion position 475 to its retraction position 576, as described with respect to FIG. 6.

Figure 5:
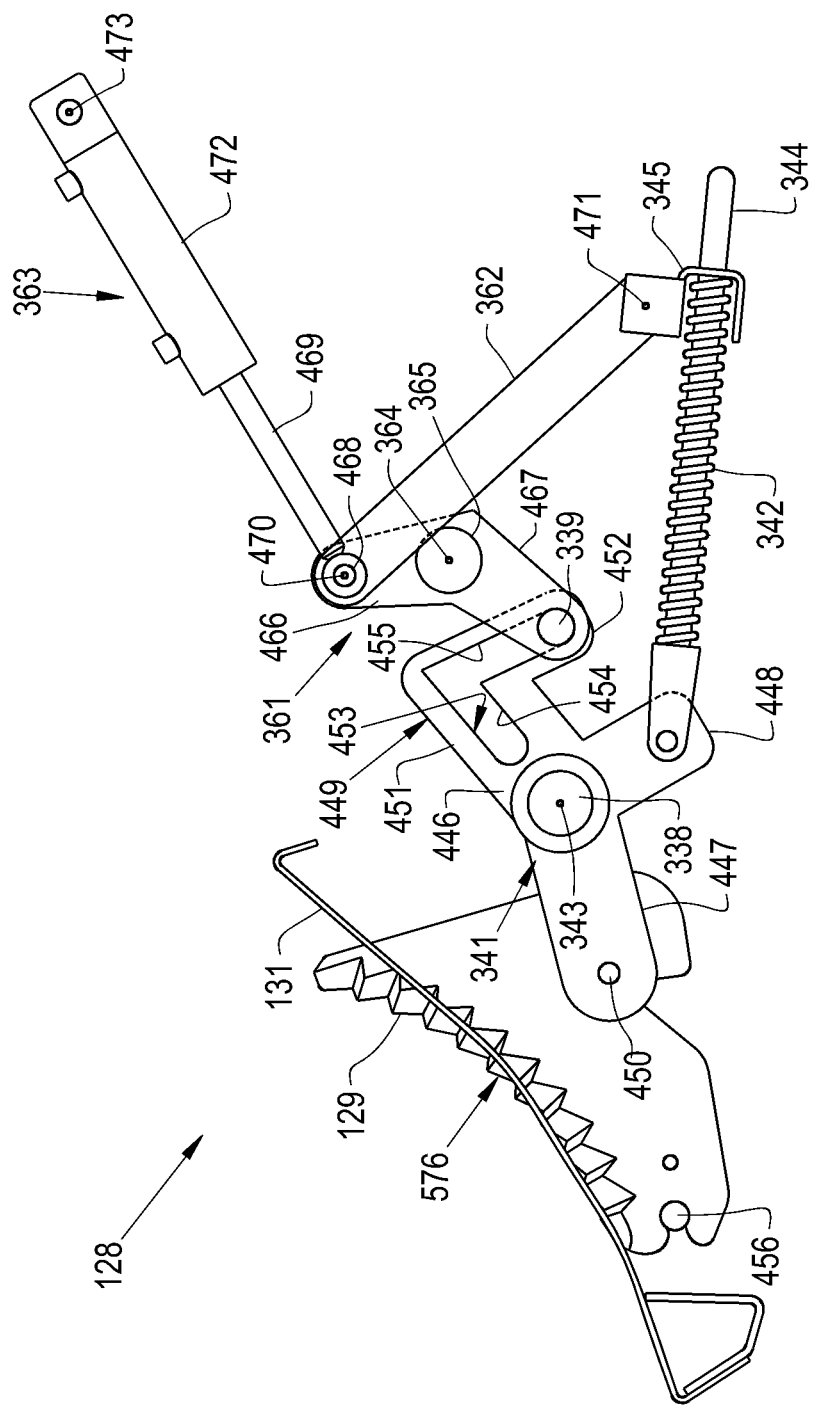
FIG. 5 illustrates a schematic side view of the cutting assembly with the overload protection mechanism and the displacement apparatus of FIG. 3, with portions broken away, the knife being in a down position, with the overload protection mechanism having also moved to a down position, in accordance with an exemplary embodiment of the present invention.

Referring now to FIG. 5, there is shown a view similar to FIG. 4, with substantially similar structure. The primary difference between FIGS. 4 and 5 is that overload protection mechanism 340 has moved from its home position (FIG. 4) to its down (retraction) position (FIG. 5). Correspondingly, knife 129 has moved from its insertion position 475 (FIG. 4) to its retraction (down) position 576 (FIG. 5). This movement from what is shown in FIG. 4 to what is shown in FIG. 5 has happened because (in normal operation) a foreign object has struck knife 129 and caused it to deflect downwardly and thus retract below floor 131, which causes a chain reaction with respect to overload protection mechanism 340. In the retraction position of overload protection mechanism 340, pivot device 341 has pivoted counter-clockwise about axis 343, caused by knife 129 moving engagement shaft 450 downward. Because of the pivoting, second arm 448 has moved rod 344 to the right (as viewed in FIG. 5), causing spring 342 to be further compressed. Displacement apparatus 360 has not changed substantially, however, during this movement of overload protection mechanism 340. Rod 469 remains fully extended. When pivot device 341 pivots counter-clockwise, engagement bar 339, which is connected to actuation arm 361, slides within slot 453. More specifically, as indicated in FIG. 5, engagement bar 339 slides from its home position in the elbow of slot 453 down second leg 455 of slot 453, so that pivot device 341 can move freely with respect to displacement apparatus 360, under these circumstances. This sliding of engagement bar 339 down second leg 455 does not require substantial movement of actuation arm 361. When the force on knife 129 caused by the foreign object has ceased, spring 342 causes rod 344 to push second arm 448 back clockwise, thus causing first arm 447 and engagement shaft 450 also to pivot clockwise, causing knife 129 to return to its insertion position 475 (shown in FIG. 4). As pivot device 361 pivots back clockwise, engagement bar 339 connected to actuation arm 361 slides in second leg 455 of slot 453 back to the elbow of slot 453 (as shown in FIG. 4).

Referring now to FIG. 6, there is shown a view similar to FIGS. 4 and 5, with substantially similar structure. The primary difference between FIG. 6 and FIGS. 4 and 5 is that overload protection mechanism 340 has moved, not because of a foreign object striking knife 129 but because of displacement apparatus 360 causing pivot device 341 to pivot counter-clockwise, which in turn has caused knife 129 to deflect downwards to its retraction position 576. In this way, displacement apparatus 360 is configured for selectively forcing knife 129 to occupy retraction position 576. More specifically, from its home position (FIG. 4), displacement apparatus 360 causes engagement bar 339 to move from the elbow of slot 453 down into and first leg 454 of slot 453, as indicated in FIG. 6. That is, hydraulic fluid can be removed from cylinder 472, causing rod 469 to be retracted to its fully retracted position, as shown in FIG. 6, with cylinder 472 able to rotate about axis 473 as necessary. The retraction of rod 469 causes pivoting to occur of actuation arm 361 about axis 364 and stabilizing arm 362 about axis 470 and axis 471. Further, this retraction of rod 469 causes actuation arm 361 to pivot clockwise about axis 364, which causes engagement bar 339 to move from the home position in the elbow of slot 453 (FIG. 4) down first leg 454 of slot 453. This movement of engagement bar 339 causes engagement bar 339 to move through an arc (left and up, as viewed in FIG. 6), which causes pivot device 341 to pivot counter-clockwise about axis 343. As with FIG. 5, this pivoting counter-clockwise of pivot device 341 causes engagement shaft 450 to deflect downwards, causing knife 129 to deflect downwards as well and thus to pivot about pivot 456. This pivoting of pivot device 341, as with FIG. 5, further causes second arm 448 to cause spring 342 to compress further. A user of baler 101 may wish to forcibly cause knives 129 to move to retraction position 576 in this way because dirt and debris 656 may have collected on or about knife 129 and/or slots 232, thus causing knives 129 to jam in their insertion position 475 and thus unable to retract, as when a rock hits one or more knives 129. On the other hand, even if jamming does not occur, the user may wish to run baler 101 with knives 129 retracted, as it may be advantageous not to cut the crop material 136 using knives 129 under certain circumstances. Knives 129 are thus held in retraction position 576 so long as rod 469 of actuator 363 is retracted.

Conversely, user may wish to return knives 129 to their insertion position 475 from retraction position 576, in which displacement apparatus 360 forcibly placed the knives 129. To do so, components of cutting assembly 128 are returned to their position shown in FIG. 4 from what is shown in FIG. 6. To do this, rod 469 of actuator 363 returns to its fully extended position, for example, by way of insertion of hydraulic fluid in cylinder 472. Upon doing so, cylinder 472 can be pivoted about axis 473, stabilizing arm 362 pivots counter-clockwise about axis 471, and actuation arm 361 pivots counter-clockwise about axis 364. This pivoting of actuation arm 361 causes engagement shaft 339 to travel back through first leg 454 of slot 453 to the elbow of slot 453, which causes pivot device 341 to pivot clockwise, causing first arm 447 and engagement shaft 450 to move knives 129 back to their insertion position 475. In this way, displacement apparatus 360 is configured for selectively forcing the at least one knife 129 to occupy insertion position 475. Though spring 342 will help urge knife 129 back to insertion position 475 as well, this urging of knife 129 is superfluous and thus is not relied upon and not needed to move knives 129 from retraction position 576 to insertion position 475; the power, for example, to power through blockages comes from the hydraulic force of actuator 363. The force provided by actuator 363, through actuation arm 361 and engagement bar 339, is sufficient alone to move knife 129, by way of pivot device 341 and engagement shaft 450, back to insertion position 475.

FIG. 6 further includes controller 123 and sensors 677, 678, and/or 679 operatively coupled with controller 123 (and also controller 115)(for illustrative purposes controller 123 and sensors 677, 678, 679 are shown in FIG. 6 but not FIGS. 4 and 5 as well, though they can be impliedly present). Sensors 677, 678, 679 are shown schematically. Each of sensors 677, 678, 679 can be position sensors and form part of control system 122 (and control system 114). Sensor 677 can be coupled with pivot device 341 and/or pivot bar 338 and can be configured for sensing a position, such as an angular position, of pivot device 341. Similarly, sensor 678 can be coupled with actuation arm 361 and/or shaft 365 and can be configured for sensing a position, such as an angular position, of actuation arm 361. Further, sensor 679 can be coupled with cylinder 472 (on an interior or an exterior of cylinder 472) and can be configured for sensing a position of rod 469 relative to cylinder 472, thus sensing the position of rod 469 in terms of its stroke. Sensors 677, 678, 679 can take this position data and form it into position signals, which can be outputted by sensors 677, 678, 679 to controller 123, which is configured for receiving the position signals from sensors 677, 678, 679. Upon receiving these position signals, controller 123 is configured for outputting this information to a display of input/output device 120 in cab 105 of tractor 100, so that user can know this information. In this way, user can be informed, such as by way of sensor 677, about the position of pivot device 341 and thus also of knife 129, whether knife 129 is in insertion position 475 or retraction position 576. Further, user can be informed, such as by way of sensor 678, about the position of actuation arm 361, whether actuation arm 361 is in its home position or pivoted; if actuation arm 361, then this would correspond to engagement bar 339 being in first leg 454 and thus pivot device 341 being down and knife 129 being in retraction position 576. Further, user can be informed, such as by way of sensor 679, about the position of rod 469, whether it is fully extended or fully retracted, for example. If rod 469 is fully extended, then this indicates actuation arm 361 is in the home position. If rod 469 is fully retracted, then this indicates actuation arm 361 is also pivoted, and engagement bar 339 is in first leg 454, with the result that pivot device 341 is down and knife 129 is in retraction position 576.

Further, a user (such as the operator of tractor 100), upon being informed of the position of these structures, can issue commands by way of input/output device 120 to controller 123 to move knife 129 down or up, that is to retraction position 576 or insertion position 475. For instance, when knife 129 is in insertion position 475 and overload protection mechanism 340 and displacement apparatus 360 are in their respective home positions, as sensed by sensors 667, 678, 679, user can command controller 123 to move knife 129 (that is, the full bank of knives 129) to retraction position 576. Upon doing so, controller 123 will output a signal to valving associated with actuator 363 to retract rod 469. Sensors 677, 678, 679 will sense the positions of their respective structures and provide this position data to controller 123, indicating when rod 469 is retracted and when, for example, actuation arm 361 and pivot device 361 have pivoted an adequate amount so that knife 129 is in retraction position 576. Upon receiving these position signals, controller 123 will know when to output a signal to cause rod 469 to stop retracting (or to stop trying to retract). Similarly, when knife 129 is in retraction position 576, user can enter a command by device 120 to controller 123 to command knife 129 to be moved back to insertion position 475. Sensors 677, 678, 679 will provide their position data to controller 123, and controller 123 can output corresponding signals to actuator 363 to cause rod 469 to extend, and the position data from sensor 677, 678, 679 will enable controller 123 to know when to halt movement of rod 469.

In use, user of tractor 100 and baler 101 can bale crop material 136 (such as baling hay), using cutting assembly 128 as part of feeder system 108. Cutting assembly 128 includes an overload protection mechanism 340 for each individual knife 129 using spring 342. Cutting assembly 128 also includes displacement apparatus 360 assigned to the entire bank of knives 129. User can set the knives 129 to be in their insertion position 475 so as to cut crop material 136 in smaller segments. When one or more knives 129 encounters a rock, for example, this rock can cause the knives 129 it contacts to deflect downward from insertion position 475 to retraction position 576, and upon the passing of this rock, spring 342 can cause pivot device 341 to pivot counter-clockwise so as to return the corresponding knife 129 to return to insertion position 475. On the other hand, user can force knives 129 from insertion position 475 into retraction position 576 to clear jamming of knives 129 or when user wants to run baler 101 without cutting crop material 136 by knives 129, for example. User can issue this command to controller 123 by way of device 120, and hydraulic cylinder assembly 363 will retract rod 469 so as to pivot actuation arm 361, which will cause pivot device 361 to pivot counter-clockwise so as to cause knife 129 to move down to retraction position 576. User can subsequently decide to move knives 129 back to insertion position 475 and can issue this command to controller 123 by way of device 120, and hydraulic cylinder assembly 363 will extend rod 469 so as to pivot actuation arm 361, which will cause pivot device 341 to pivot clockwise so as to cause knife 129 to move up to insertion position 576. In this way, user has positive engagement with knives 129 to raise or lower them on command, while maintaining overload protection using springs 342 as part of overload protection mechanisms 340.

Figure 7:
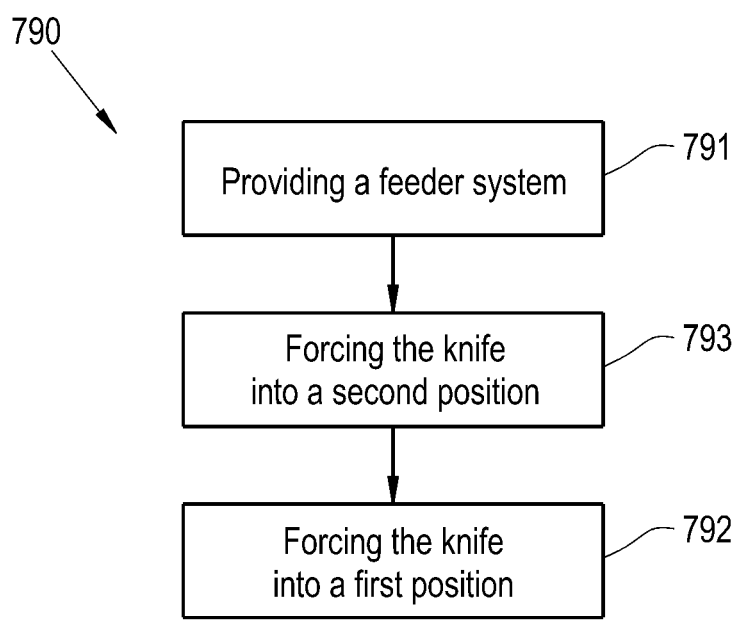
FIG. 7 illustrates a flow diagram showing a method of using an agricultural baler, in accordance with an exemplary embodiment of the present invention.

Referring now to FIG. 7, there is shown a flow diagram showing a method 790 of using an agricultural baler 101, the method including the steps of: providing 791 a frame 130 and a feeder system 108 coupled with the frame 130, the feeder system 108 including a cutting assembly 128 coupled with the frame 130, the cutting assembly 128 including at least one knife 129 configured for cutting a crop material 136 and an overload protection mechanism 340 associated with a single one of the at least one knife 129, the overload protection mechanism 340 including a pivot device 341 including an engagement device 453 including an offset configuration; forcing 792 selectively, by a displacement apparatus 360 of the cutting assembly 128, the at least one knife 129 to occupy a first position 475, by way of the engagement device 453; and forcing 793 selectively, by the displacement apparatus 360, the at least one knife 129 to occupy a second position 576, by way of the engagement device 453. The first position 475 can be an insertion position 475, and the second position 576 can be a retraction position 576. Pivot device 341 can be coupled with the at least one knife 129 and includes an extension arm 449 including the engagement device 453. Engagement device 453 can include a slot 453 including a first leg 454 and a second leg 455 offset from the first leg 454. Displacement apparatus 360 can include an actuator 363 formed as a linear actuator 363. Displacement apparatus 360 can include an actuation arm 361 which is pivotable and includes a first end 466 and a second end 467, the actuation arm 361 being coupled with the actuator 363 at the first end 466 and coupled with the engagement device 453 at the second end 467.

It is to be understood that the steps of method 790 are performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 790, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 790.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A feeder system of an agricultural baler, the feeder system being coupled with a frame of the agricultural baler, the feeder system comprising:
   a cutting assembly coupled with the frame and including:
      at least one knife configured for cutting a crop material;
      an overload protection mechanism associated with a single one of the at least one knife and including a pivot device including an engagement device having an offset configuration, the engagement device including a slot including a first leg and a second leg, wherein the first and second legs extend in different directions;
      a displacement apparatus configured for selectively forcing the at least one knife to occupy a first position and for selectively forcing the at least one knife to occupy a second position, each by way of the engagement device; and
      a pivotable actuation arm having (i) a first end that is rotatably coupled to an output of the displacement apparatus and (ii) a second end that is moveably positioned within the slot.

2. The feeder system of claim 1, wherein the first position is an insertion position, and the second position is a retraction position.

3. The feeder system of claim 2, wherein the pivot device is coupled with the at least one knife and includes an extension arm including the engagement device.

4. The feeder system of claim 1, wherein the displacement apparatus includes an actuator formed as a linear actuator.

5. The feeder system of claim 1, wherein the first and second legs extend along different axes.

6. The feeder system of claim 1, further comprising an elbow defined at the intersection of the first and second legs, wherein, in a normal operating position of the cutting assembly, the second end of the pivotable actuation arm is positioned at the elbow.

7. The feeder system of claim 1, wherein the pivot device has three different portions including a first portion that includes the slot, a second portion that is connected to the at least one knife, and a third portion.

8. The feeder system of claim 7, further comprising a biasing device that is pivotably connected to the third portion for biasing the at least one knife to the first position.

9. The feeder system of claim 8, further comprising a stabilizing arm having a first end that is pivotably connected to the first end of the pivotable actuation arm and a second end that is connected to the biasing device.

10. An agricultural baler, comprising:
a frame;
a feeder system coupled with the frame and including:
- a cutting assembly coupled with the frame and including:
  - at least one knife configured for cutting a crop material;
  - an overload protection mechanism associated with a single one of the at least one knife and including a pivot device including an engagement device having an offset configuration, the engagement device including a slot including a first leg and a second leg, wherein the first and second legs extend in different directions;
  - a displacement apparatus configured for selectively forcing the at least one knife to occupy a first position and for selectively forcing the at least one knife to occupy a second position, each by way of the engagement device; and
  - a pivotable actuation arm having (i) a first end that is rotatably coupled to an output of the displacement apparatus and (ii) a second end that is moveably positioned within the slot.

11. The agricultural baler of claim 10, wherein the first position is an insertion position, and the second position is a retraction position.

12. The agricultural baler of claim 11, wherein the pivot device is coupled with the at least one knife and includes an extension arm including the engagement device.

13. The agricultural baler of claim 10, wherein the displacement apparatus includes an actuator formed as a linear actuator.

14. A method of using an agricultural baler, the method comprising the steps of:
providing a frame and a feeder system coupled with the frame, the feeder system including a cutting assembly coupled with the frame, the cutting assembly including (i) at least one knife configured for cutting a crop material, (ii) an overload protection mechanism associated with a single one of the at least one knife, the overload protection mechanism including a pivot device having an engagement device including an offset configuration, the engagement device including a slot including a first leg and a second leg, wherein the first and second legs extend in different directions, (iii) a displacement apparatus, and (iv) a pivotable actuation arm having (a) a first end that is rotatably coupled to an output of the displacement apparatus and (b) a second end that is moveably positioned within the slot;
forcing selectively, by the displacement apparatus of the cutting assembly, the at least one knife to occupy a first position, by way of the engagement device; and
forcing selectively, by the displacement apparatus, the at least one knife to occupy a second position, by way of the engagement device.

15. The method of claim 14, wherein the first position is an insertion position, and the second position is a retraction position.

16. The method of claim 15, wherein the pivot device is coupled with the at least one knife and includes an extension arm including the engagement device.

17. The method of claim 14, wherein the displacement apparatus includes an actuator formed as a linear actuator.

* * * * *